US011366489B2

(12) United States Patent
Ko

(10) Patent No.: US 11,366,489 B2
(45) Date of Patent: Jun. 21, 2022

(54) ELECTRONIC APPARATUS AND CONTROL METHOD THEREOF

(71) Applicant: Samsung Electronics Co., Ltd., Suwon-si (KR)

(72) Inventor: Moonjoon Ko, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 180 days.

(21) Appl. No.: 16/383,114

(22) Filed: Apr. 12, 2019

(65) Prior Publication Data

US 2019/0324495 A1    Oct. 24, 2019

(30) Foreign Application Priority Data

Apr. 20, 2018   (KR) .................. 10-2018-0046081

(51) Int. Cl.
*G06F 1/16*    (2006.01)
*G06F 3/0482*    (2013.01)
*G06F 3/04842*    (2022.01)

(52) U.S. Cl.
CPC .......... *G06F 1/1605* (2013.01); *G06F 3/0482* (2013.01); *G06F 3/04842* (2013.01)

(58) Field of Classification Search
CPC .. G06F 1/1605; G06F 3/0482; G06F 3/04842; H04L 12/2807; H04L 2012/2849; H04L 65/102; H04N 21/23418; H04N 21/43615; H04N 21/4751; H04N 21/4755; H04N 21/84

See application file for complete search history.

(56) References Cited

U.S. PATENT DOCUMENTS

| 8,971,803 | B2* | 3/2015 | Dua ..................... H04B 5/02 455/41.1 |
| 2005/0147118 | A1* | 7/2005 | Jonsson .............. H04L 65/1069 370/465 |
| 2008/0066124 | A1* | 3/2008 | Igoe ................. H04N 21/42204 725/81 |

(Continued)

FOREIGN PATENT DOCUMENTS

KR    10-2013-0119444    10/2013

OTHER PUBLICATIONS

European Communication dated Mar. 6, 2020 in European Patent Application No. 19167420.9.

(Continued)

*Primary Examiner* — Khaled M Kassim
(74) *Attorney, Agent, or Firm* — Staas & Halsey LLP

(57) ABSTRACT

An electronic apparatus and control method therefor is provided. The electronic apparatus includes a communicator configured to communicate with a plurality of electronic devices, and a processor. The processor is configured to obtain information about multimedia content in response to an event occurring in relation to the multimedia content, select at least one electronic device among the plurality of electronic devices based on the obtained information about the multimedia content and reference information referring to multimedia contents previously designated in correspondence with the plurality of electronic devices, respectively, and control the communicator to transmit the multimedia content to the selected at least one electronic device.

16 Claims, 12 Drawing Sheets

(56) References Cited

U.S. PATENT DOCUMENTS

| | | | |
|---|---|---|---|
| 2011/0184862 A1* | 7/2011 | Lanier | H04L 65/4076 |
| | | | 705/40 |
| 2012/0221662 A1* | 8/2012 | Yasukawa | H04L 12/2812 |
| | | | 709/206 |
| 2012/0297423 A1 | 11/2012 | Kanojia et al. | |
| 2013/0212615 A1 | 8/2013 | Schultz | |
| 2014/0024310 A1* | 1/2014 | Dua | H04L 12/282 |
| | | | 455/41.1 |
| 2014/0047487 A1* | 2/2014 | Guedalia | H04L 67/16 |
| | | | 725/80 |
| 2015/0018992 A1 | 1/2015 | Griffiths et al. | |
| 2016/0335418 A1 | 11/2016 | Fan | |
| 2017/0091197 A1* | 3/2017 | Qin | G06F 16/4393 |
| 2017/0208364 A1 | 7/2017 | Glazier et al. | |
| 2017/0222973 A1 | 8/2017 | Bangma et al. | |
| 2017/0244574 A1 | 8/2017 | Moon et al. | |
| 2018/0077449 A1* | 3/2018 | Herz | H04W 4/70 |
| 2018/0192122 A1* | 7/2018 | Rajapakse | H04N 21/43615 |
| 2018/0217718 A1* | 8/2018 | Lew | H04L 51/14 |

OTHER PUBLICATIONS

Extended European Search Report dated Jul. 29, 2019 in European Patent Application No. 19167420.9.
European Office Action for corresponding EP 19 167 420.9, dated Sep. 25, 2020.
European Office Action for European Patent Application No. 19167420.9 dated Apr. 8, 2021.
Korean Office Action dated Mar. 31, 2022 in Korean Patent Application No. 10-2018-0046081 (5 pages; 6 pages English translation).

\* cited by examiner

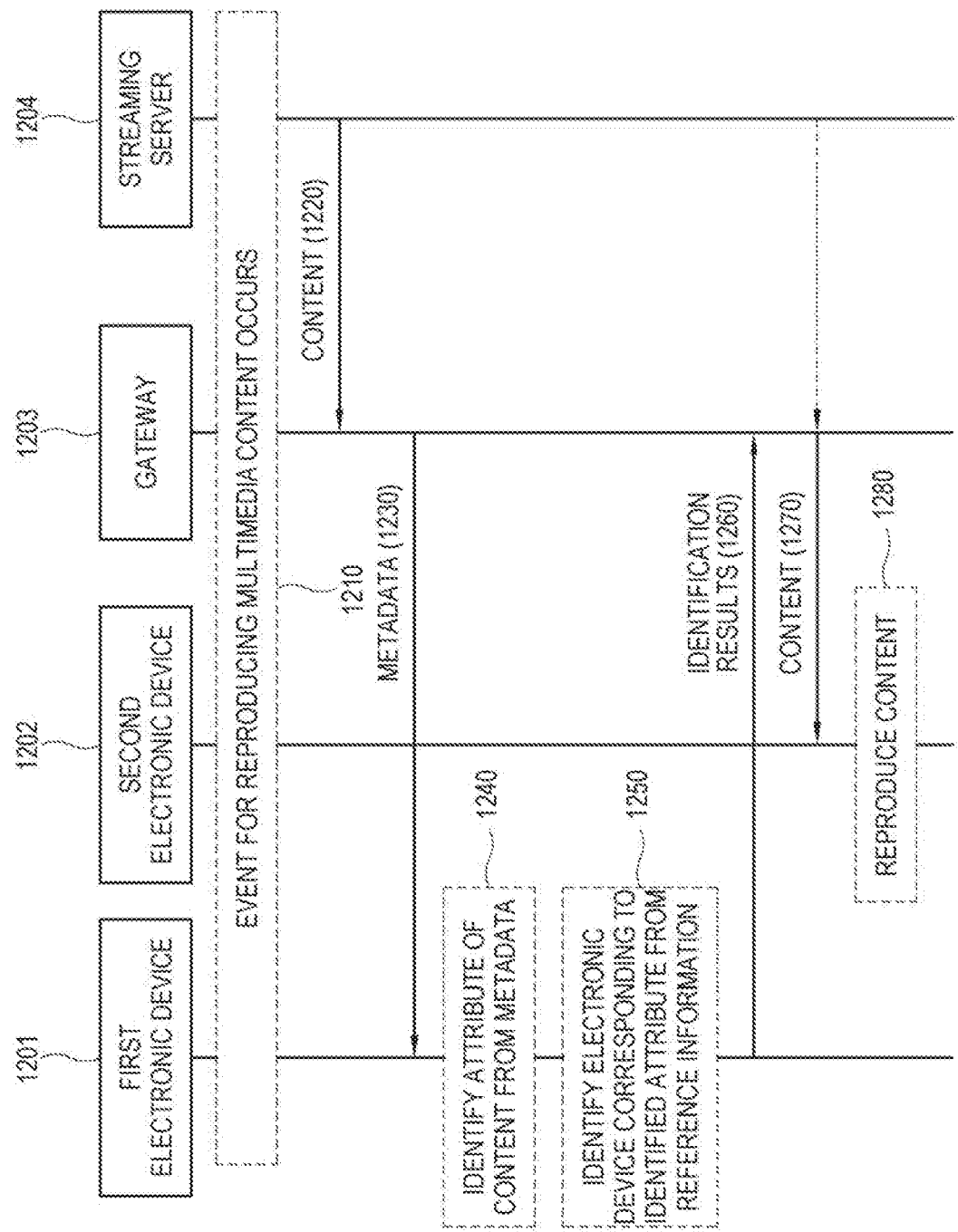

ELECTRONIC APPARATUS AND CONTROL METHOD THEREOF

CROSS-REFERENCE TO RELATED THE APPLICATION

This application is based on and claims priority under 35 U.S.C. § 119 to Korean Patent Application No. 10-2018-0046081 filed on Apr. 20, 2018 in the Korean Intellectual Property Office, the disclosure of which is incorporated by reference herein in its entirety.

BACKGROUND

Field

The present disclosure relates to an electronic apparatus used for communication with a plurality of terminals in a network system and a control method thereof, and more particularly to an electronic apparatus, which has a structure for transmitting streaming content received from the outside (external source) to an electronic device, and a control method thereof.

Description of the Related Art

To compute and process predetermined information in accordance with certain processes, an electronic apparatus basically includes a central processing unit (CPU), a chipset, a memory, and the like electronic components for computation. Such an electronic apparatus may be variously classified in accordance with what information will be processed. For example, the electronic apparatus is classified into an information processing apparatus such as a personal computer (PC), a server or the like for processing general information; and an image processing apparatus for processing image information. Various electronic apparatuses such as an image processing apparatus, a display apparatus, an information processing apparatus, etc. are provided as entities to perform previously given functions by themselves.

Meanwhile, a plurality of electronic apparatuses are connected to perform communication with one another and form a network system, and the electronic apparatuses collaborate with one another under such a system to thereby perform various extended functions that cannot be performed by each individual entity. As a general and simple example of the network system, there is a home network established in a home. Here, the network system may involve not only electronic apparatuses in usual acceptation, but also an electric light bulb and the like entities, each of which corresponds to a simple function and includes a sensor and a communication module so as to be under the network system. As an example of such a concept, there is Internet of things (IoT).

As one of methods of constructing the network system, there is an infrastructure construction. In the network system having the infrastructure construction, a certain electronic apparatus among the plurality of electronic apparatuses serves as a hub, a gateway or a communication relay for communication and relays the communication between other electronic apparatuses. A representative example of such an electronic apparatus is an access point (AP) for supporting wireless communication such as Wi-Fi. The AP is connected to a wireless area network (WAN) by a wire, and performs wireless communication with a plurality of terminals, thereby allowing each terminal to access the WAN.

To make a certain electronic device reproduce multimedia content which is streaming from a predetermined streaming server through the WAN, the multimedia content received in the gateway has to be transmitted to the electronic device. Conventionally, a certain electronic device within the network system displays a user interface (UI) for allowing a user to designate a specific electronic device or designate connection among a plurality of electronic devices, and the gateway transmits the streaming data to a specific electronic device in accordance with settings designated through the UI. However, such a method may be inconvenient for a user because the user has to manually designate a streaming target in accordance with multimedia content.

Thus, the network system may demand a method of streaming multimedia content received in the gateway to an electronic device desired by a user without manual settings of the user.

SUMMARY

According to an embodiment of the present disclosure, there is provided an electronic apparatus including: a communicator configured to communicate with a plurality of electronic devices; and a processor. The processor is configured to: obtain information about multimedia content in response to an event occurring in relation the multimedia content, select at least one electronic device among the plurality of electronic devices based on the obtained information about the multimedia content and reference information referring to multimedia contents previously designated in correspondence with the plurality of electronic devices, respectively, and control the communicator to transmit the multimedia content to the selected at least one electronic device.

The processor may select the at least one electronic device by searching the reference information and as a result of the searching, the at least electronic device is matched in correspondence with a preset attribute of the multimedia content in relation to which the event has occurred.

The processor may store the reference information which is input through a user interface (UI) designate the at least one electronic device corresponding to the preset attribute of the multimedia content, and may call the reference information when the event occurs.

The UI may further display a sub menu including items to select one electronic device among the plurality of electronic devices with regard to a designated attribute of the multimedia content, and an item unselectable by a user, the item corresponding to a respective one electronic device among the plurality of electronic devices using which the multimedia content is unreproducible.

The item unselectable by user on the sub menu may be determined based on device information of the respective electronic device among plurality of device information provided from the plurality of electronic devices, respectively.

The preset attribute of the multimedia content may includes a genre of the multimedia content or a media type of the multimedia content.

The processor may identify the preset attribute of the multimedia content from metadata of the multimedia content.

The processor may select the electronic device based on the reference information of a currently identified user among a plurality of pieces of the reference information respectively provided with regard to a plurality of users.

The processor may select the electronic device based on reference information of another user when the electronic device is unselectable based on the reference information of the currently identified user.

The processor may receive the multimedia content from another apparatus through the communicator or obtains the multimedia content which is stored in a storage.

According to an embodiment of the disclosure a method of controlling an electronic apparatus, the method including: obtaining information about multimedia content in response to an event occurring in relation the multimedia content; selecting at least one electronic device among a plurality of electronic devices based on the obtained information about the multimedia content and reference information referring to multimedia contents previously designated in correspondence with the plurality of electronic devices, respectivley; and controlling the multimedia content to be transmitted to the selected at least one electronic device.

The at least one electronic device may be selected by searching the reference information and as a result of the searching, the at least electronic device is matched in correspondence with a preset attribute of the multimedia content in relation to which the event has occurred.

The method may further including storing the reference information which is input through a user interface (UI) provided to designate the at least one electronic device corresponding to the preset attribute of the multimedia content, and calling the reference information when the event occurs.

The UI may further display a sub menu including items to select one electronic device among the plurality of electronic devices with regard to a designated attribute of the multimedia content, and an item unselectable by a user, the item corresponding to a respective one electronic device among the plurality of electronic devices using which the multimedia content is unreproducible.

The item unselectable by the user on the sub menu may be determined based on device information of the respective electronic device among plurality of device information provided from the plurality of electronic devices, respectively.

The preset attribute of the multimedia content may includes a genre of the multimedia content or a media type of the multimedia content.

The method may further including identifying the preset attribute of the multimedia content from metadata of the multimedia content.

The method may further including selecting the electronic device based on the reference information of a currently identified user among a plurality of pieces of the reference information respectively provided with regard to a plurality of users.

The method may further including selecting the electronic device based on reference information of another user when the electronic device is unselectable based on the reference information of the currently identified user.

The method may further including receiving the multimedia content from another apparatus through the communicator or obtaining the multimedia content which is stored in a storage.

BRIEF DESCRIPTION OF THE DRAWINGS

The above and/or other aspects will become apparent and more readily appreciated from the following description of embodiments, taken in conjunction with the accompanying drawings, in which:

FIG. 12 illustrates an example of a signal transceiving process by which an electronic device in a network system according to an embodiment of the disclosure selects a predetermined electronic device for reproducing content streaming from a server.

DETAILED DESCRIPTION OF EMBODIMENTS

Below, embodiments will be described in detail with reference to accompanying drawings. Further, the embodiments described with reference to the accompanying drawings are not exclusive to each other unless otherwise mentioned, and a plurality of embodiments may be selectively combined within one apparatus. The combination of these plural embodiments may be discretionally selected and applied to realize the present inventive concept by a person having an ordinary skill in the art.

In the description of the embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the disclosure.

Further, "at least one" among a plurality of elements in the disclosure represents not only all the elements but also each one of the elements, which excludes the other elements or all combinations of the elements.

Figure 1:
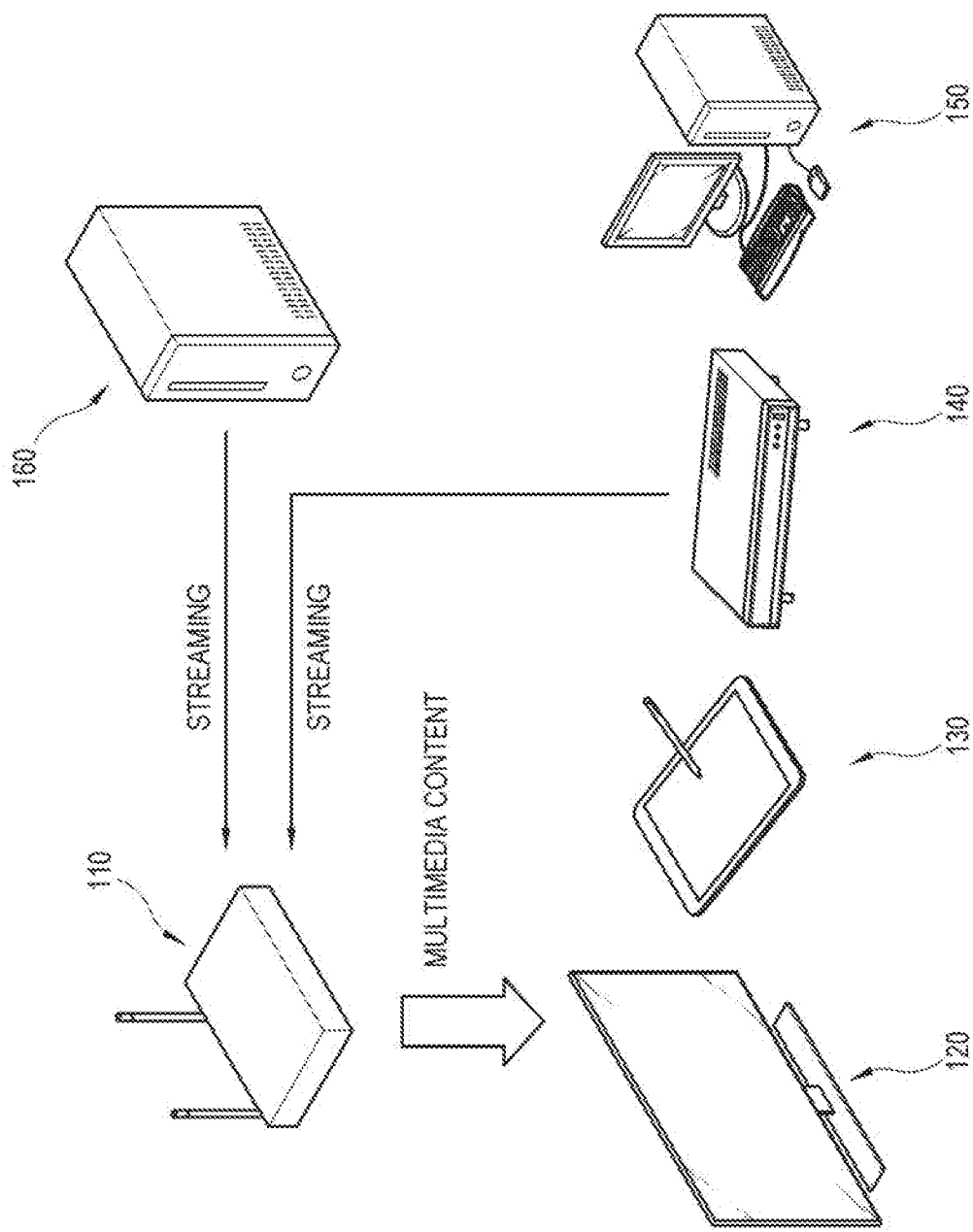
FIG. 1 illustrates an example of a network system according to an embodiment of the disclosure.

FIG. 1 illustrates an example of a network system according to an embodiment of the disclosure.

As shown in FIG. 1, the network system according to this embodiment includes a plurality of electronic apparatuses 110, 120, 130, 140 and 150 connected to communicate with one another in accordance with preset communication standards. The network system supports one or more wireless communication standards such as Wi-Fi and the like considering various factors such as arranged positions of the electronic apparatuses 110, 120, 130, 140 and 150, and the electronic apparatuses 110, 120, 130, 140 and 150 perform communication with one another based on wireless communication.

The electronic apparatuses 110, 120, 130, 140 and 150 are not limited to a certain kind of apparatuses, and include entities or things corresponding to various kinds, shapes and functions. For example, the electronic apparatuses 110, 120, 130, 140 and 150 may be actualized by a TV, an electronic frame and the like display apparatus capable of displaying an image; a set-top box and the image processing apparatus capable of processing an image signal without directly displaying an image; a washing machine, a refrigerator, an air conditioner and the like general home appliances; a printer, a copying machine, a scanner and the like office machine; or a light bulb, an electric heater, and other apparatuses. Further, the electronic apparatuses 110, 120, 130, 140 and 150 may be actualized by various wearable devices or mobile devices.

The electronic apparatuses 110, 120, 130, 140 and 150 may have peer-to-peer communication connection for one-to-one direct communication with each other. However, when the number of electronic apparatuses 110, 120, 130, 140 and 150 increases within the network system, there arise many restrictions on use of a peer-to-peer communication connection method such as an ad-hoc mode or Wi-Fi Direct. Thus, the network system according to this embodiment has a communication connection structure of an infrastructure mode.

In the infrastructure mode, the plurality of electronic apparatuses 110, 120, 130, 140 and 150 of the network system are classified into two as follows. One is the electronic apparatus 110 connected to the Internet and serving as a communication host or a communication relay. The others are the electronic apparatuses 120, 130, 140 and 150 performing wireless communication connection with the electronic apparatus 110 so as to access the Internet and communicate with other electronic apparatuses.

The electronic apparatus 110 serves as a gateway via which other electronic apparatuses 120, 130, 140 and 150 of a communication layer lower than that of the electronic apparatus 110 are connected to the Internet or the like wide area network (WAN) of a communication layer higher than that of the electronic apparatus 110, so that the other electronic apparatuses 120, 130, 140 and 150 can communicate with a server 160 on the Internet. Further, the electronic apparatus 110 relays communication connection among other electronic apparatuses 120, 130, 140 and 150 within the network system.

To this end, the electronic apparatus 110 may be actualized by a gateway, a hub, a router, an access point (AP), etc. Alternatively, the electronic apparatus 110 may be actualized by a set-top box, a TV, home appliances, or the specific-functional electronic apparatus capable of functioning as the gateway. Within the network system, one gateway 110 is provided according to this embodiment. Alternatively, two or more gateways may be provided.

Under such a structure, a certain electronic device 120, 130, 140 or 150 may receive a streaming service of multimedia content. An apparatus for providing the streaming service may refer to a streaming server on the Internet outside the network system, or a certain electronic device 120, 130, 140 or 150 inside the network system. In the former case, the server 160 transmits multimedia content to a gateway 110. In the latter case, the electronic apparatus 130, 140 or 150 transmits multimedia content to the gateway 110. Alternatively, multimedia content may be stored in the gateway 110.

The gateway 110 transmits the multimedia content to the electronic device 120, 130, 140 or 150 corresponding to the streaming multimedia content. The electronic device 120, 130, 140 or 150 reproduces the multimedia content received from the gateway 110. Such an operation does not require a user to make an input for designating a certain electronic device 120, 130, 140 or 150 inside the network system, but is automatically performed by the gateway 110. In other words, the gateway 110 receives the streaming multimedia content and automatically selects the electronic device 120, 130, 140 or 150 optimized to reproduce the corresponding multimedia content, and it is more convenient to use a streaming service.

Below, the configurations of the gateway 110 and the electronic apparatuses 120, 130, 140 or 150 will be described.

Figure 2:
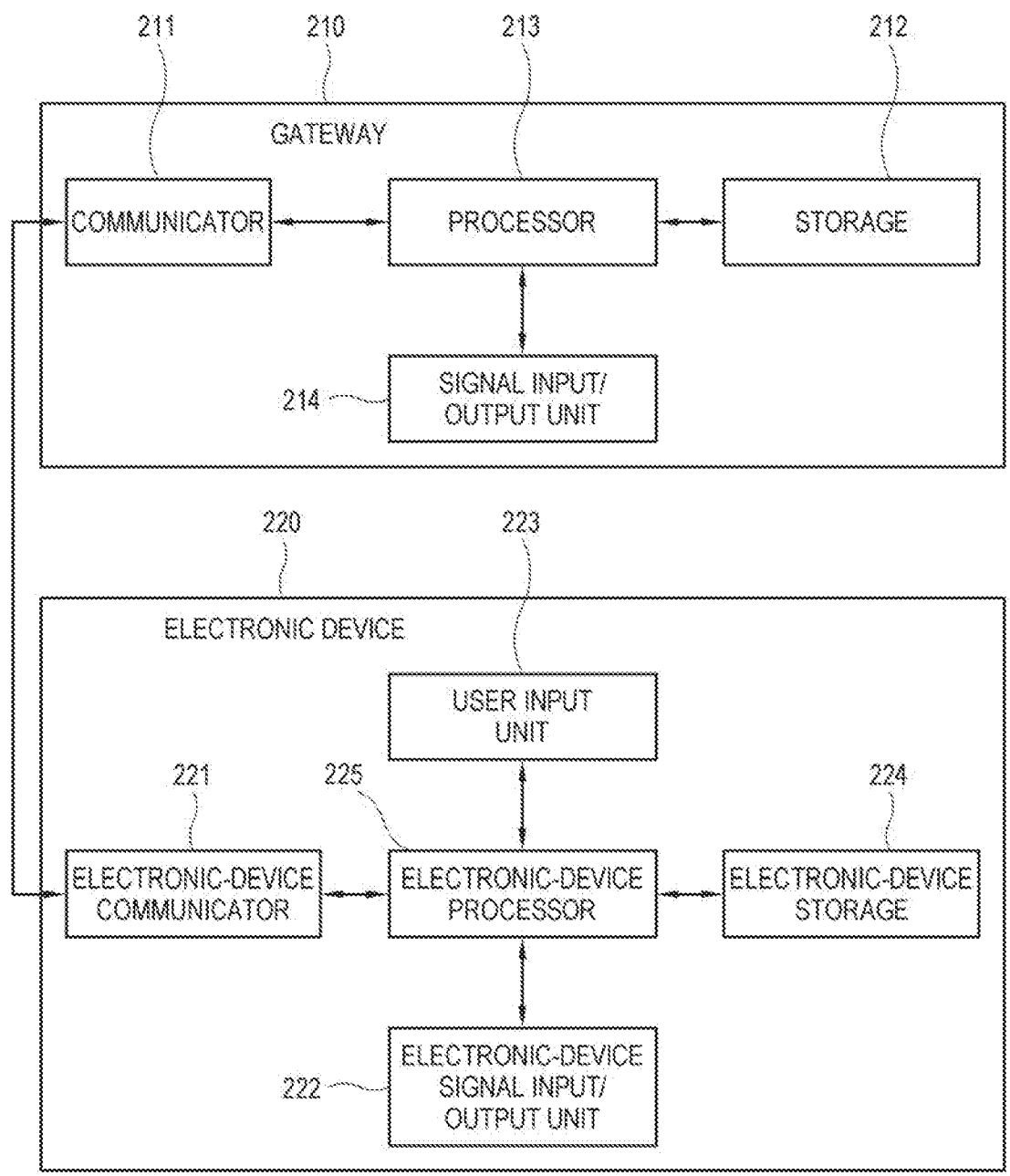
FIG. 2 is a block diagram of a gateway and an electronic apparatus according to an embodiment of the disclosure.

FIG. 2 is a block diagram of a gateway and an electronic apparatus according to an embodiment of the disclosure.

As shown in FIG. 2, a gateway 210 includes a communicator 211 configured to communicate with the Internet and each electronic device 220; a storage 212 configured to store data; and a processor 213 configured to process signals transmitted and received through the communicator 211. Further, the electronic device 220 includes an electronic-device communicator 221 to communicate with the gateway 210, an electronic-device signal input/output unit 222 to receive and output a signal with regard to other apparatuses, a user input unit 223 through which a user can make an input, an electronic-device storage 224 configured to store data, and an electronic-device processor 225 to process a signal received through the electronic-device communicator 221 or the electronic-device signal input/output unit 222.

The electronic device 220 may further include a display to display an image, or may not include the display but output a predetermined image signal through the electronic-device signal input/output unit 222 so that another apparatus can display an image. Further, in this embodiment, a configuration of only one electronic device 220 among a plurality of electronic devices included in the network system will be described. The other electronic devices of the network system are equivalent to the electronic device 220 in this embodiment, and thus repetitive descriptions thereof will be avoided.

The communicator 211 refers to a communication circuit including data input/output interfaces where communication modules, communication chips, local area network (LAN) cards, etc. are combined corresponding to various wired and wireless communication protocols. For example, the communicator 211 is connected to the Internet by a wire to thereby access the Internet, and performs wireless communication with the electronic device 220. In this embodiment, the communicator 211 supports Wi-Fi and the like infrastructure-based wireless communication protocols, and thus enables interactive communication between the plurality of electronic devices 220 or interactive communication between the electronic device 220 and the Internet.

The storage 212 is accessed by the processor 213, and performs operations such as reading, recording, modifying, deleting, etc. for data under control of the processor 213. The storage 212 includes a flash memory, a hard disk drive (HDD), a solid state drive (SSD), and the like nonvolatile memory in which data is retained regardless of whether power is supplied or not; and a buffer, a random access memory (RAM) and the like volatile memory to which processing data is loaded. For example, the storage 212 in this embodiment is configured to store information about the electronic device 220. Descriptions about this information will be made later.

The processor 213 includes a hardware processor actualized by a central processing unit (CPU), a chipset, a buffer, a circuit, etc., which are mounted on a printed circuit board, and may be actualized by a system on chip (SoC) according to designs. The processor 213 constructs the communication connection with the electronic devices 220, and processes each electronic device 220 to do communication operation through the gateway 210 under a communication connection state. According to this embodiment, the processor 213 obtains information about content when the content is streamed from the server through the communicator 211. The processor 213 selects the electronic device 220 corresponding to identified content, based on the obtained information about the content and information related to the electronic device 220 previously stored in the storage 212. The processor 213 controls the content to be transmitted to the selected electronic device.

Meanwhile, the gateway 210 may be designed to further include a signal input/output unit 214 to receive and transmit a predetermined signal separately from the communicator 211. The signal input/output unit 214 may for example include an input/output interface such as a high definition multimedia interface (HDMI) port, a DisplayPort, or the like to output a signal. The gateway 210 may use the signal input/output unit 214 to output streaming content to the electronic device 220, but this embodiment will describe that the gateway 210 uses the communicator 211 to transmit content.

The electronic-device communicator 221 includes a communication circuit such as a wireless communication chip, a wireless communication module, etc. provided to perform wireless communication with the gateway 210. The electronic-device communicator 221 has a media access control (MAC) address as unique identification (ID), and the Mac address of the electronic-device communicator 221 may be used by the gateway 210 as one of ID names of the electronic device 220 for identifying a certain electronic device 220 within the network system.

The electronic-device signal input/output unit 222 refers to an interface through which the electronic device 220 directly transmits and receives a signal to and from other apparatuses by one-to-one or one-to-many without using the gateway 210. For example, when the electronic device 220 is a set-top box and another apparatus is a TV, the electronic-device signal input/output unit 222 may include an input/output interface such as the HDMI port, the DisplayPort, etc. to output a signal to the TV.

The user input unit 223 includes various kinds of input interfaces provided to allow a user to make an input. The user input unit 223 may be given in various forms depending on the kinds of electronic device 220, for example, a mechanical or electronic button of the electronic device 220, a remote controller separated from the electronic device 220, a touch pad, a touch screen installed on the display of the electronic device 220, etc.

The electronic-device storage 224 includes volatile and nonvolatile memories. The electronic-device storage 224 is configured to store data input by the user input unit 223 or data processed by the electronic-device processor 225, and returns the data in response to a request of the electronic-device processor 225.

The electronic-device processor 225 includes a hardware processor actualized by a central processing unit (CPU), a chipset, a buffer, a circuit, etc. mounted on to a printed circuit board, and may alternatively actualized by a system on chip (SoC) according to design methods. When content is received in the electronic-device communicator 221, the electronic-device processor 225 processes the content and reproduces the processed content in itself or outputs the processed content through the electronic-device signal input/output unit 222 so that another apparatus can reproduce the content. Further, the electronic-device processor 225 displays a UI for allowing a user to input a user account and information about the electronic device 220 and transmits the information input through the UI to the gateway 210. This UI will be further described later.

Below, operations of the gateway according to an embodiment of the disclosure will be described.

Figure 3:
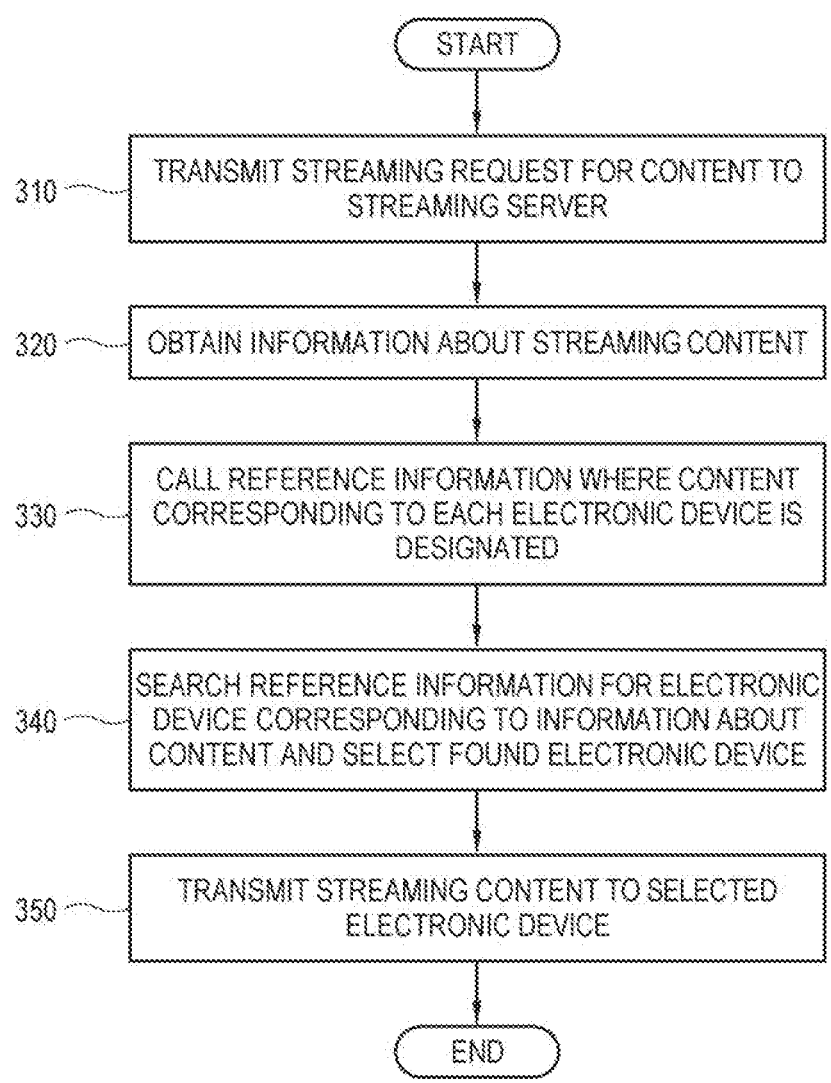
FIG. 3 is a flowchart of controlling a gateway according to an embodiment of the disclosure.

FIG. 3 is a flowchart of controlling a gateway according to an embodiment of the disclosure.

As shown in FIG. 3, the following operations are performed by the processor of the gateway.

When a content-related event occurs, for example, a request for streaming content is received, at operation 310, the gateway transmits this request to the streaming server. The streaming server may be a server outside the network system or a certain apparatus inside the network system. Further, the streaming request may be made from any apparatus inside the network system.

At operation 320, the gateway obtains information about the content (such as streaming content) received from the streaming server. This information may include various characteristics, attributes, etc. of content.

At operation 330, the gateway calls reference information where content corresponding to each electronic device is designated. The reference information may be about a plurality of electronic devices within the network system. The reference information refers to information in which content is previously designated corresponding to each of the plurality of electronic devices. Detailed descriptions about the reference information will be made later.

At operation 340, the reference information is searched for electronic device corresponding to information about content. As a result of the search at operation 340, the gateway retrieves and selects an electronic device, which corresponds to the obtained information about the content, from the called reference information.

At operation 350, the gateway transmits the streaming content to the selected electronic device. Thus, the corresponding electronic device can reproduce the content received through the gateway.

Like this, the gateway can automatically select the electronic device, which is optimized to reproduce the content, among many electronic devices inside the system.

In this embodiment, there are no limits to the kind of content-related event. For example, the content-related event may include an event for reproducing moving image content to be streamed, an event for only displaying a still image or the like content on the electronic device, and an event for only designating the electronic device to which the content will be transmitted without reproducing the content.

Below, a method of generating the reference information to be stored in the gateway will be described.

Figure 4:
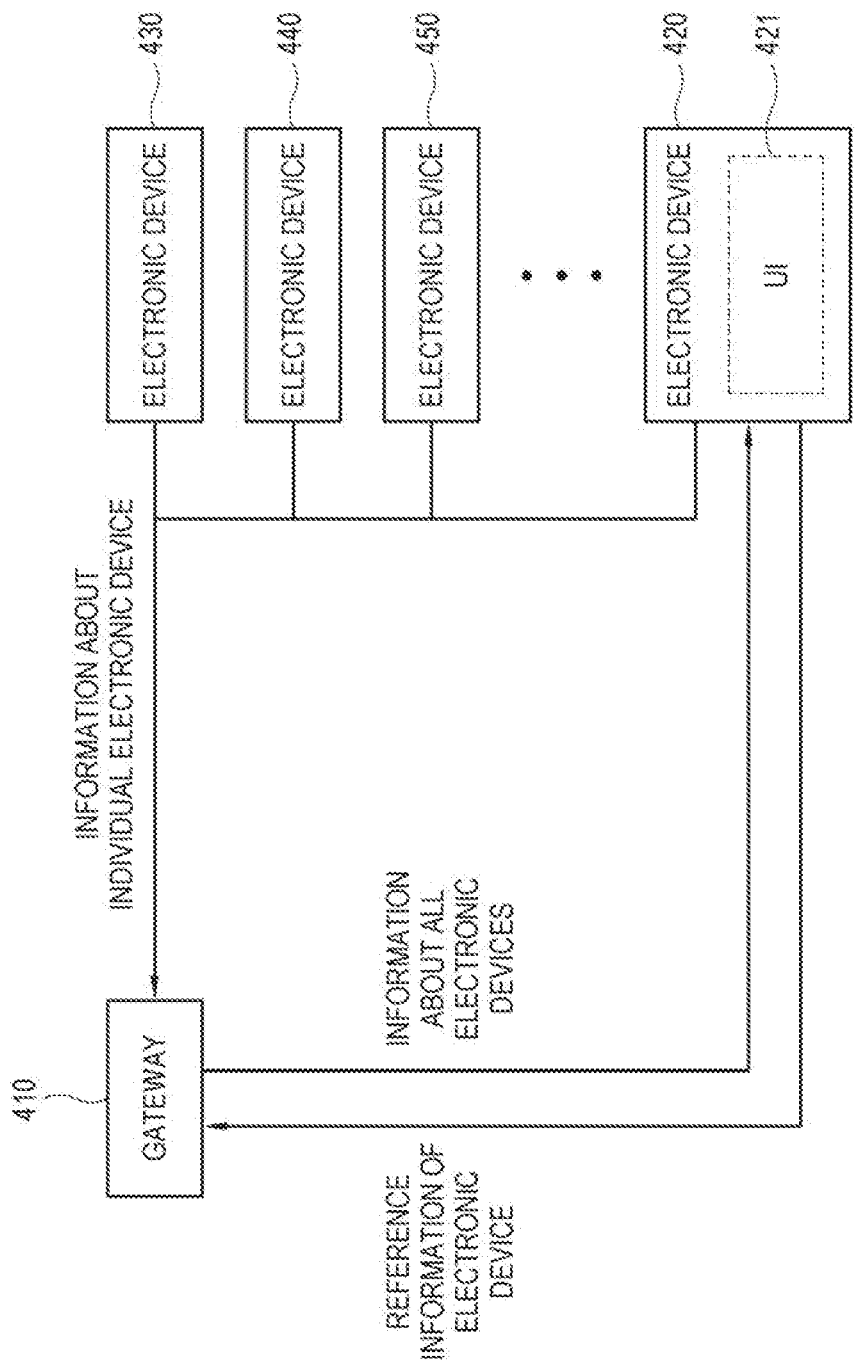
FIG. 4 illustrates an example of a process where a gateway according to an embodiment of the disclosure transmits information needed for generating reference information of an electronic device.

FIG. 4 illustrates an example of a process where a gateway according to an embodiment of the disclosure transmits information needed for generating reference information of an electronic device.

As shown in FIG. 4, for communication inside the network system, a gateway 410 receives information about a plurality of electronic devices 420, 430, 440 and 450 from each individual electronic device 420, 430, 440, 450. The information about the electronic device 420, 430, 440, 450 refers to attributes and characteristics of devices and performances about the electronic devices 420, 430, 440 and 450, for example, the kind of electronic device 420, 430, 440, 450, the model name of the electronic device 420, 430, 440, 450, the main hardware data of the electronic device 420, 430, 440, 450, the support specifications of the electronic device 420, 430, 440, 450, the support standards of the electronic device 420, 430, 440, 450, and the like.

For example, when the electronic device 420, 430, 440, 450 is a TV, the attribute information of the corresponding electronic device 420, 430, 440, 450 includes the kind, the model name, the manufacturer information, the display size, the maximum display resolution, support signal transmission standards, the image formats, and the like information of the corresponding electronic device 420, 430, 440, 450. For example, when the electronic device 420, 430, 440, 450 is a loudspeaker, the attribute information of the corresponding electronic device 420, 430, 440, 450 includes the kind, the model name, manufacturer information, the number of loudspeakers, the support audio channels, and the like information of the corresponding electronic device 420, 430, 440, 450.

Under such environments, the reference information of the plurality of electronic devices 420, 430, 440 and 450 may be generated in the gateway 410 or may be generated in a certain electronic device 420. When the reference information is generated through the electronic device 420, the gateway 410 provides information about the plurality of electronic devices 420, 430, 440 and 450 inside the network system to the corresponding electronic device 420.

The reference information refers to information where content is matched to each individual electronic device 420, 430, 440, 450 corresponding to the content, i.e. suitable for reproducing the content. There may be many methods of generating such reference information. For example, the reference information may be generated by a method based on a user input made through a user interface (UI) 421.

The electronic device 420 displays the UI 421 for allowing a user to designate the reference information of the plurality of electronic devices 420, 430, 440 and 450, based on the information of the plurality of electronic devices 420, 430, 440 and 450 received from the gateway 410. When the gateway 410 includes a display, the gateway 410 may display the UI 421. Detailed descriptions about the UI 421 will be made later.

The electronic device 420 transmits the reference information, which is input by a user through the UI 421, to the gateway 410. The gateway 410 stores the reference information received from the electronic device 420, and specifies the electronic device 420, 430, 440, 450, to which content will be transmitted, based on the previously stored reference information when the content is streamed.

Below, an example of a UI displayed on the electronic device will be described.

Figure 5:
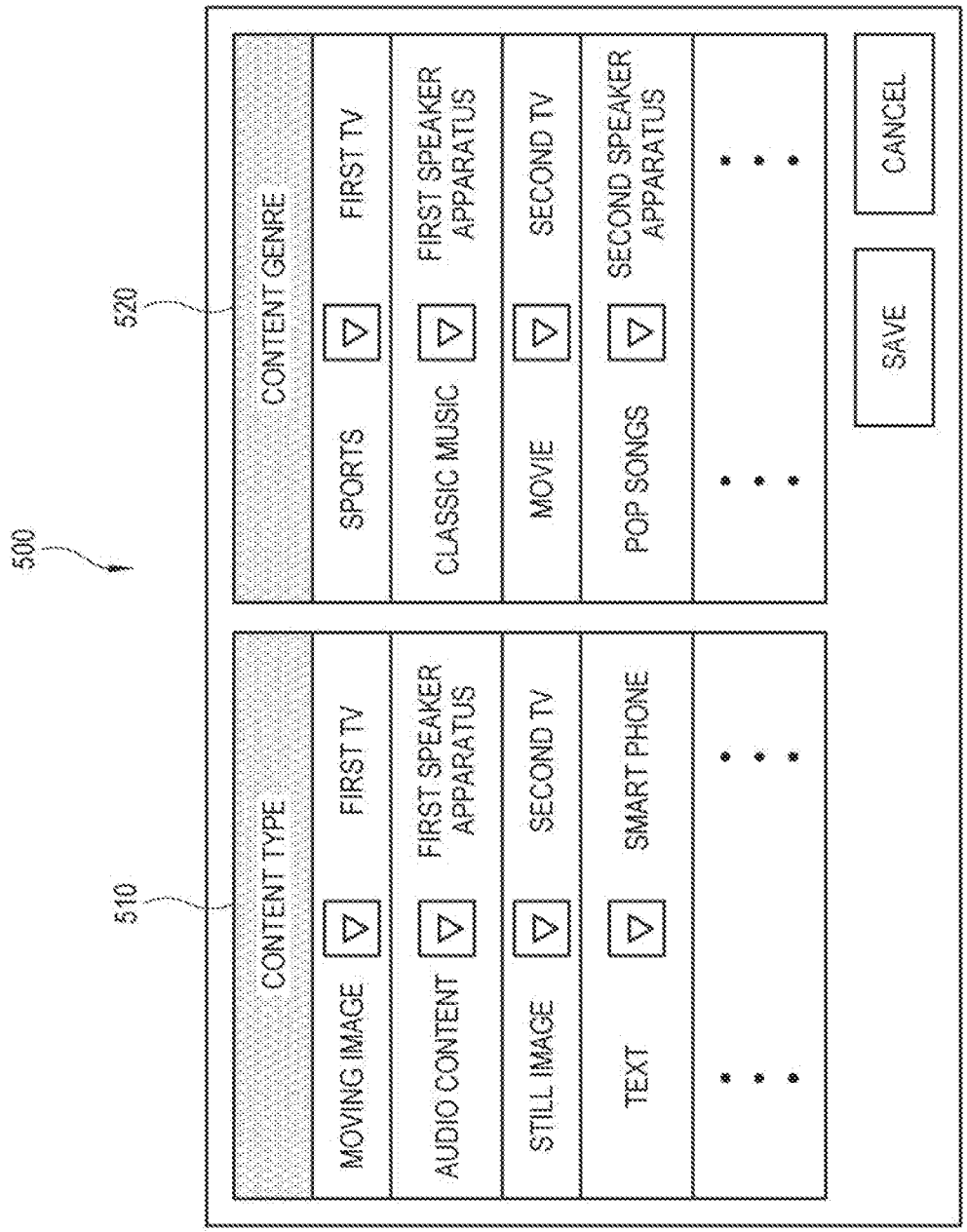
FIG. 5 illustrates an example of a user interface (UI) for generating the reference information displayed on the electronic device according to an embodiment of the disclosure.

FIG. 5 illustrates an example of a user interface (UI) for generating the reference information displayed on the electronic device according to an embodiment of the disclosure.

As shown in FIG. 5, the electronic device or the gateway may display a UI 500 to generate or modify the reference information for specifying a target to which streaming content will be transmitted. The UI 500 is provided to make a user designate an electronic device, which corresponds to attributes of content, among a plurality of electronic devices inside a network system communicating with the gateway.

The attributes or characteristics of content are sorted in various preset categories. In this embodiment, the types and genres of content will be given by way of example. However, various attributes of content may be applied when a product is actually manufactured. There are many methods of making a predetermined apparatus determine the attributes of content. For example, the attributes of content may be identified through various pieces of information based on metadata of content.

In this embodiment, descriptions will be made with regard to a first UI 510 for allowing a user to designate an item about a content type, and a second UI 520 for allowing a user to designate an item about a content genre. The UI 500 displayed on a screen may include one or more of the first UI 510 and the second UI 520. When there are additional attributes to be designated by a user, the UI 500 may include an additional option besides the first UI 510 and the second UI 520.

The first UI 510 is provided to designate an electronic device corresponding to a type of content among content attributes. The content type refers to an attribute showing what media type the content is, for example, a moving image, a still image, a text, audio content, an application, etc. The first UI 510 is provided to match one among the plurality of electronic devices inside the network system to each individual content type. Through the first UI 510, a user can designate an electronic device corresponding to the content type, i.e. an electronic device suitable for reproducing the content according the types. For example, a first TV may be designated for content of the moving image, and a first loudspeaker may be designated for content of the audio content.

Meanwhile, the second UI 520 is provided to designate an electronic device corresponding to a genre of content among content attributes. The content genre may for example include sports, classic music, movies, pop songs, news, drama, animation, etc. The second UI 520 is provided to match one among the plurality of electronic devices inside the network system to each individual content genre. Through the second UI 520, a user can designate an electronic device corresponding to the content genre, i.e. an electronic device suitable for reproducing the content according the genres. For example, the first TV may be designated for content of the sports, a second TV may be designated for content of the movie, and the first loudspeaker may be designated for content of the classic music.

When each electronic device is completely designated by a user through the UI 500, the electronic device of displaying the UI 500 sends the gateway the reference information based on the designation input through the UI 500. The gateway stores the reference information received from the electronic device, and selects an electronic device, by which content will be reproduced, based on the previously stored reference information when an event for reproducing the streaming content occurs.

For example, based on the reference information, the gateway transmits content to the first TV when the type of content received from the streaming server is the moving image, and transmits content to the second TV when the type of content is the still image. Further, the gateway transmits content to the first loudspeaker when the genre of content received from the streaming server is the classic music, and transmits content to the second loudspeaker when the genre of content is the pop song.

When there are two or more attributes of content in the reference information stored in the gateway, the gateway basically selects an electronic device corresponding to one attribute, and may select an electronic device corresponding to the other attributes when there is difficulty in selecting the electronic device corresponding to the corresponding attributes. In this regard, detailed descriptions will be made later.

Meanwhile, the electronic device may receive information about each individual electronic device inside the network system from the gateway, and display the UI 500 based on the corresponding information. As described above, the gateway receives and stores such information from each individual electronic device so as to perform communication with the plurality of electronic devices. Below, an embodiment, in which the information about the attributes of each individual electronic device is reflected in the UI 500, will be described.

Figure 6:
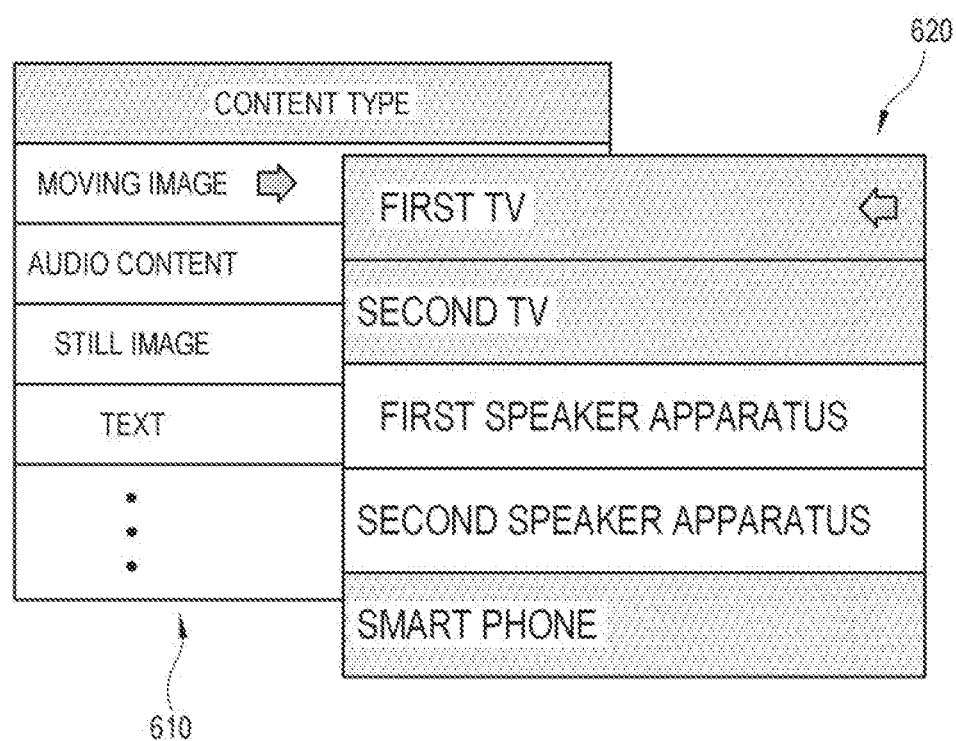
FIG. 6 illustrates an example that a sub menu for designating the electronic device is displayed in the UI displayed on the electronic device according to an embodiment of the disclosure.

FIG. 6 illustrates an example that a sub menu for designating the electronic device is displayed in the UI displayed on the electronic device according to an embodiment of the disclosure.

As shown in FIG. 6, for example, the electronic device displays a UI 610 for allowing a user to designate the electronic device corresponding to the content type. The UI 610 is equivalent to that described in the foregoing embodiment. The electronic device may display a sub menu 620, which is provided to designate one among the plurality of electronic devices with regard to a certain content type, on the UI 610 in a popup form.

When there are the first TV, the second TV, the first loudspeaker, the second loudspeaker, and a smart phone as an electronic device capable of communicating with the gateway within the network system, the sub menu 620 shows these electronic devices to be selectable by a user. As necessary, the sub menu 620 may not display all of five devices, i.e. the first TV, the second TV, the first loudspeaker, the second loudspeaker, and the smart phone. Based on the attributes of the electronic devices according to the information about the electronic devices, the electronic device suitable for the designated attribute of the content is displayed to be selectable, but the electronic device unsuitable for the designated attribute of the content is displayed not to be selectable on the sub menu 620.

That is, on the sub menu 620, the electronic device suitable for the designated attribute of the content is activated to be selectable by a user, but the electronic device unsuitable for the designated attribute of the content is inactivated not to be selectable by a user. Alternatively, only the selectable item corresponding to the electronic device suitable for the designated attribute of the content may be displayed on the sub menu 620, but the selectable item corresponding to the electronic device unsuitable for the designated attribute of the content may be not displayed. Such operations are performed by the electronic device displaying the UI 610 and the sub menu 620.

For example, it will be assumed that the designated attribute of the content is the moving image. The moving image is reproducible by only an electronic device including a display or an electronic device capable of outputting an image signal to a predetermined apparatus including a display. Among five electronic devices, i.e. the first TV, the second TV, the first loudspeaker, the second loudspeaker, and the smart phone, there are three electronic devices capable of reproducing the moving image, i.e. the first TV, the second TV, and the smart phone, and there are two electronic devices incapable of reproducing the moving image of content, i.e. the first loudspeaker, and the second loudspeaker. Thus, the sub menu 620 displays the items corresponding to the first TV, the second TV and the smart phone to be selectable by a user, but the first loudspeaker and the second loudspeaker not to be selectable by a user.

In the sub menu 620, the items selectable by a user and the items non-selectable by the user are displayed in different colors to be easily distinguished in between by a user.

Like this, the UI for designating the reference information based on the attributes of the electronic device may be displayed.

Meanwhile, there may be many users who uses the electronic devices within the network system, and therefore a user account is needed for distinguishing a plurality of users, who uses the same electronic device, from one another. In this case, the reference information may be provided in units of the user account. Below, a method where the gateway selects the electronic device for reproducing content based on the user account will be described.

Figure 7:
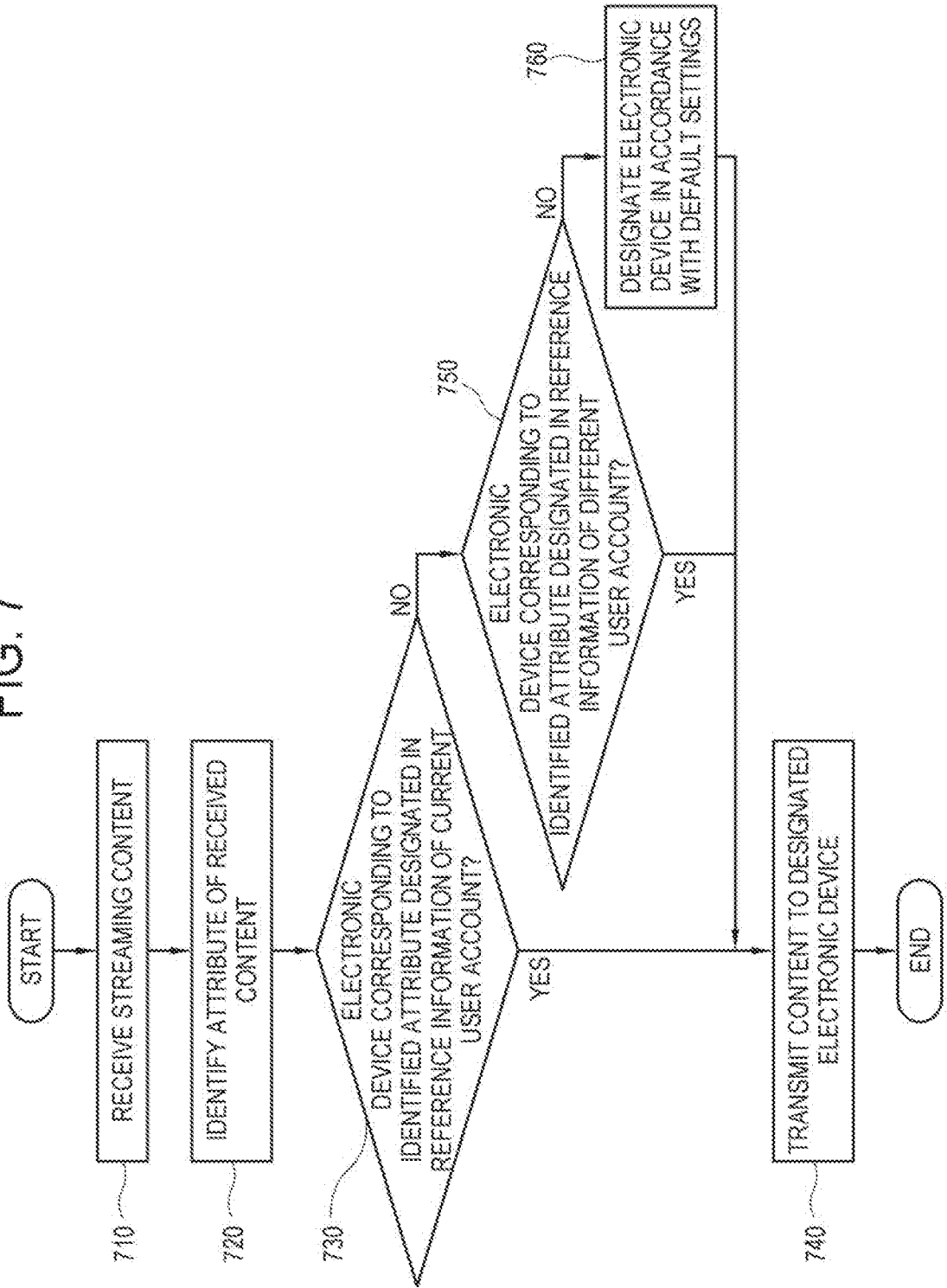
FIG. 7 is a flowchart showing a method where the gateway according to an embodiment of the disclosure selects the electronic device with regard to reference information of a user account.

FIG. 7 is a flowchart showing a method where the gateway according to an embodiment of the disclosure selects the electronic device with regard to reference information of a user account.

As shown in FIG. 7, the following operations are performed by a processor of the gateway.

At operation 710, the gateway receives streaming content.

At operation 720, the gateway identifies attribute of received content (distinguishes among the attributes of the received content). The gateway may identify the attributes, i.e. the genre, type, etc. of the content, based on the metadata of the content.

At operation 730, the gateway determines whether the electronic device corresponding to the identified attribute of the content is designated in reference information of a currently logged-in user account.

When the electronic device corresponding to the identified attribute of the content is designated in the reference information of the current user account, at operation 740, the gateway transmits the content to the designated electronic device.

On the other hand, when the electronic device corresponding to the identified attribute of the content is not designated in the reference information of the current user account or when the current user account does not have the reference information, at operation 750, the gateway determines whether the electronic device corresponding to the identified attribute of the content is designated in reference information of a different user account. Here, when there are a plurality of different user accounts, one of the different user accounts may be selected in accordance with preset priority.

When the electronic device corresponding to the identified attribute of the content is designated in the reference information of the different user account, the gateway returns to the operation 740.

On the other hand, when the electronic device corresponding to the identified attribute of the content is not designated in the reference information of the different user account or when the different user account does not have the reference information, at operation 760, the gateway designates the electronic device in accordance with default settings, and returns to the operation 740.

Thus, the gateway selectively refers to the reference information of the user account in accordance with circumstances, and selects the electronic device by which the content will be reproduced.

Below, when there are two or more attributes of content designated in reference information, a method where the gateway selects an electronic device for reproducing the content will be described.

Figure 8:
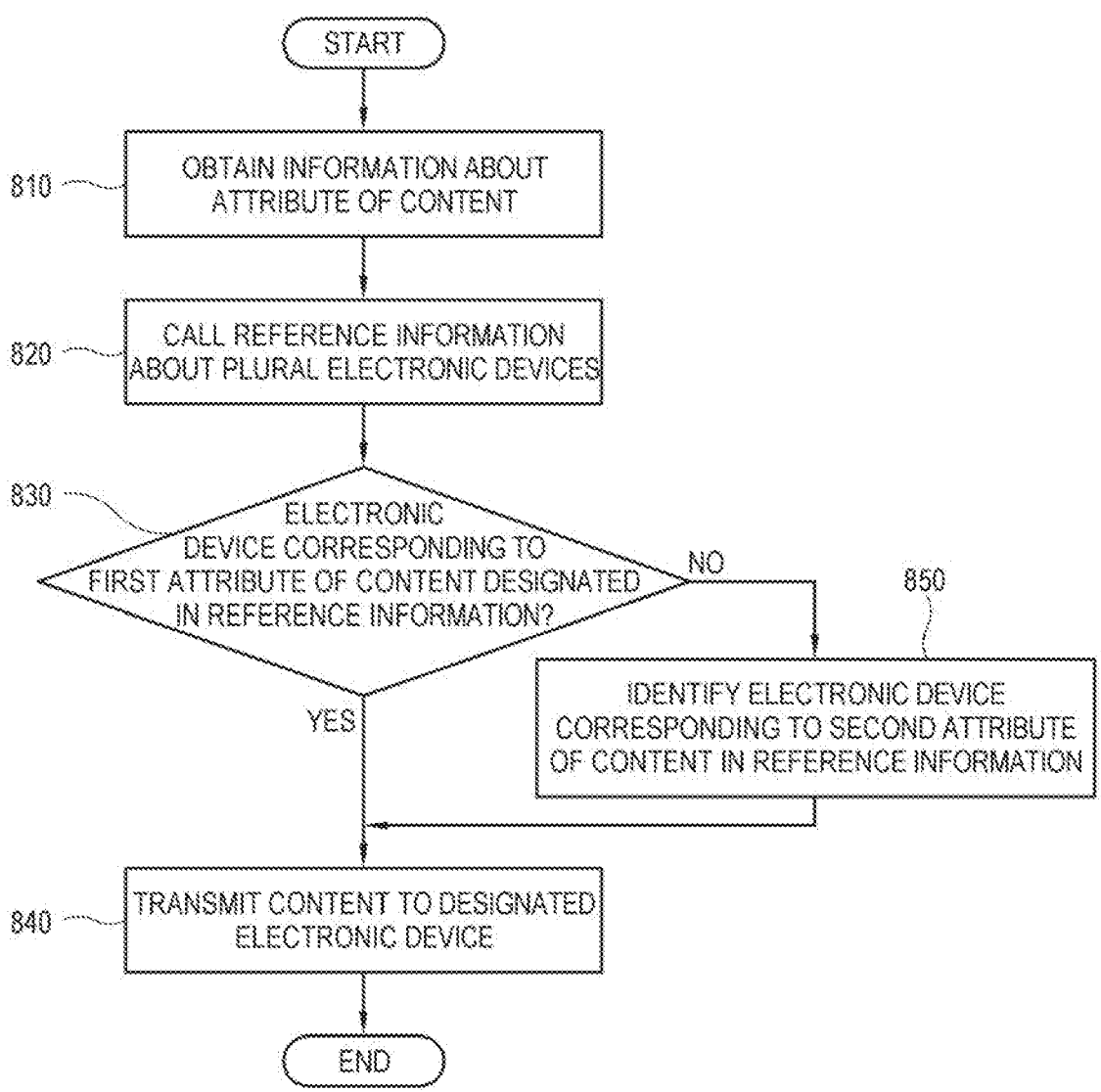
FIG. 8 is a flowchart showing a method where the gateway according to an embodiment of the disclosure selects the electronic device based on a plurality of attributes of content designated in the reference information.

FIG. 8 is a flowchart showing a method where the gateway according to an embodiment of the disclosure selects the electronic device based on a plurality of attributes of content designated in the reference information;

As shown in FIG. 8, the following operations are performed by the processor of the gateway.

At operation 810, the gateway obtains information about attributes of streaming content. The gateway identifies one or more attributes of the content based on the metadata of the content.

At operation 820, the gateway calls the reference information about the plurality of electronic devices.

At operation 830, the gateway identifies whether an electronic device corresponding to a first attribute of the content is designated in the reference information.

When the electronic device corresponding to the first attribute of the content is designated in the reference information, at operation 840, the gateway transmits the content to be reproduced in the designated electronic device.

On the other hand, when the electronic device corresponding to the first attribute of the content is not designated in the reference information, at operation 850, the gateway identifies an electronic device corresponding to a second attribute of the content in the reference information and returns to the operation 840.

In this embodiment, two attributes of content are taken into account. Alternatively, three or more attributes may be taken into account. In this case, the gateway sequentially considers the plurality of attributes in accordance with predetermined order.

An example of actualizing this embodiment is as follows. Basically, the gateway selects an electronic device corresponding to a content genre based on the reference information. However, when there is difficulty in selecting the electronic device corresponding to the content genre, the gateway selects an electronic device corresponding to a content type. In more detail, for example, when the genre of the streaming content is a documentary, the gateway determines whether the electronic device corresponding to the documentary is designated in the reference information. However, when the electronic device corresponding to the documentary is not found in the reference information, the gateway searches the reference information for an electronic device corresponding to the type of the streaming content, i.e. a moving image. In accordance with searching results, the gateway selects the first TV designated corresponding to the moving image.

Meanwhile, in the foregoing embodiments, the gateway identifies an attribute of content, and selects the electronic device, by which the content will be reproduced, based on the reference information. However, due to the performance of the gateway, it may be difficult for the gateway to perform the foregoing operations. In this regard, an embodiment will be described below.

Figure 9:
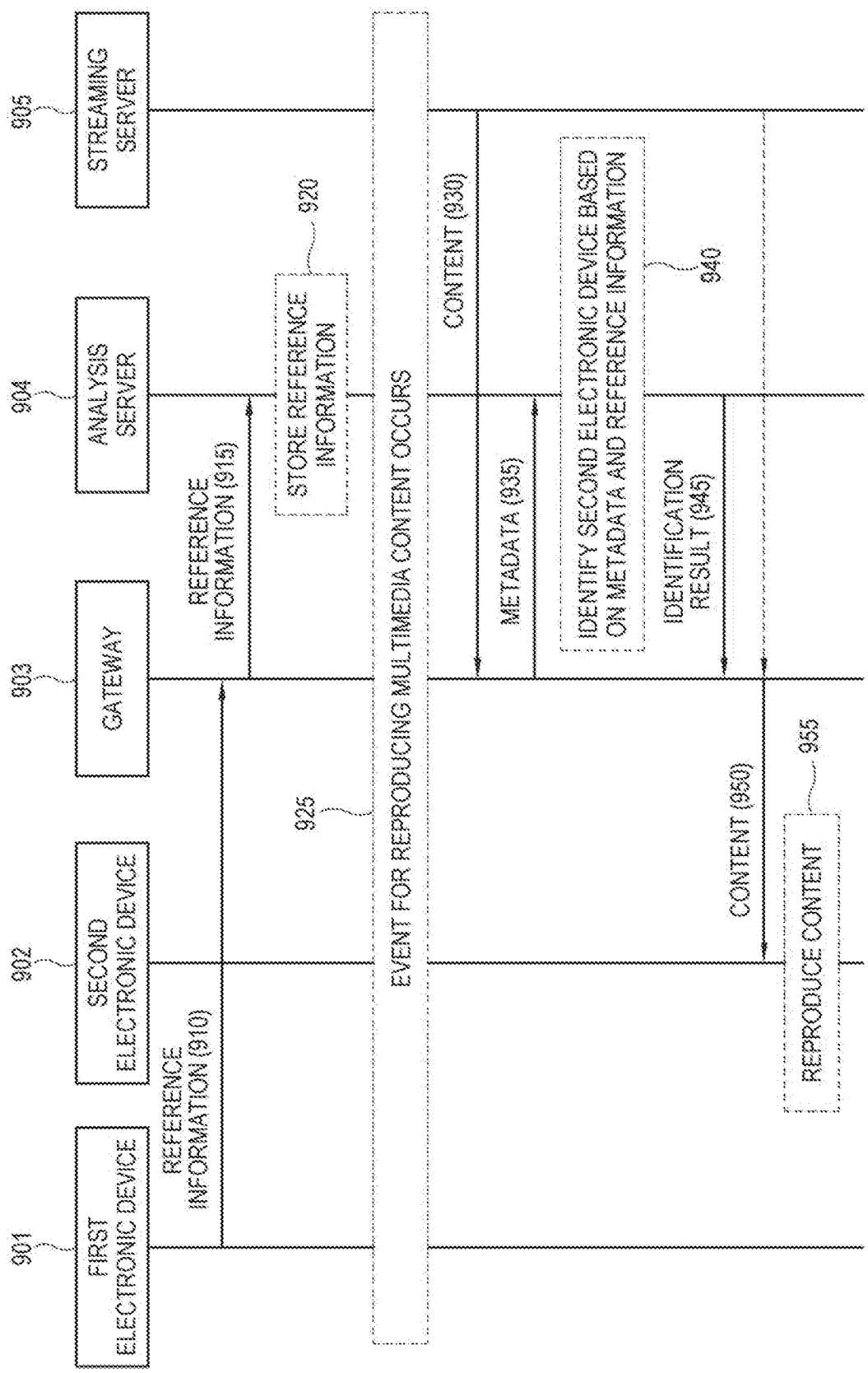
FIG. 9 illustrates an example of a signal transceiving process by which streaming content of a network system according to an embodiment of the disclosure is transmitted to an electronic device.

FIG. 9 illustrates an example of a signal transceiving process by which streaming content of a network system according to an embodiment of the disclosure is transmitted to an electronic device.

As shown in FIG. 9, a first electronic device 901, a second electronic device 902, a gateway 903, an analysis server 904, and a streaming server 905 are provided. These elements can communicate with one another through the gateway 903. In this embodiment, the first electronic device 901 and the second electronic device 902 are separately provided. Alternatively, the first electronic device and the second electronic device may be provided as one element. Further, the streaming server 905 and the analysis server 904 may be separately provided or may be provided as one element.

First, the first electronic device 901 generates and transmits reference information to the gateway 903 (910). A method of generating the reference information is equivalent to that described in the foregoing embodiments.

The gateway 903 transmits the reference information from the first electronic device 901 to the analysis server 904 (915).

The analysis server 904 stores the reference information received from the gateway 903 (920).

Then, when an event for reproducing content occurs (925), the streaming server 905 streams the content to the gateway 903 (930).

The gateway 903 transmits metadata, which is extracted from the content received from the streaming server 905, to the analysis server 904 (935). Here, the gateway 903 may transmit only the metadata, which is extracted from the streaming content, to the analysis server 904, or may directly transmit the content involving the metadata to the analysis server 904 and make the analysis server 904 extract the metadata.

The analysis server 904 identifies an electronic device suitable for reproducing content, based on metadata received from the gateway 903 and previously-stored reference information (940). For example, the analysis server 904 identifies the second electronic device 902 as the electronic device suitable for reproducing the content. A detailed method of identifying the electronic device based on the metadata and the reference information is equivalent to that described in the foregoing embodiments.

The analysis server 904 transmits an identification result to the gateway 903 (945). Therefore, the gateway 903 is informed that the corresponding content has to be transmitted to the second electronic device 902.

In accordance with the identification result received from the analysis server 904, the gateway 903 transmits the streaming content from the streaming server 905 to the second electronic device 902 (950).

The second electronic device 902 reproduces content received through the gateway 903 (955).

Like this, the electronic device suitable for reproducing the content may be identified by the analysis server 904 separately from the gateway 903.

Meanwhile, an embodiment of the disclosure may be applied to a system supporting a voice recognition function. Below, such an embodiment will be described.

Figure 10:
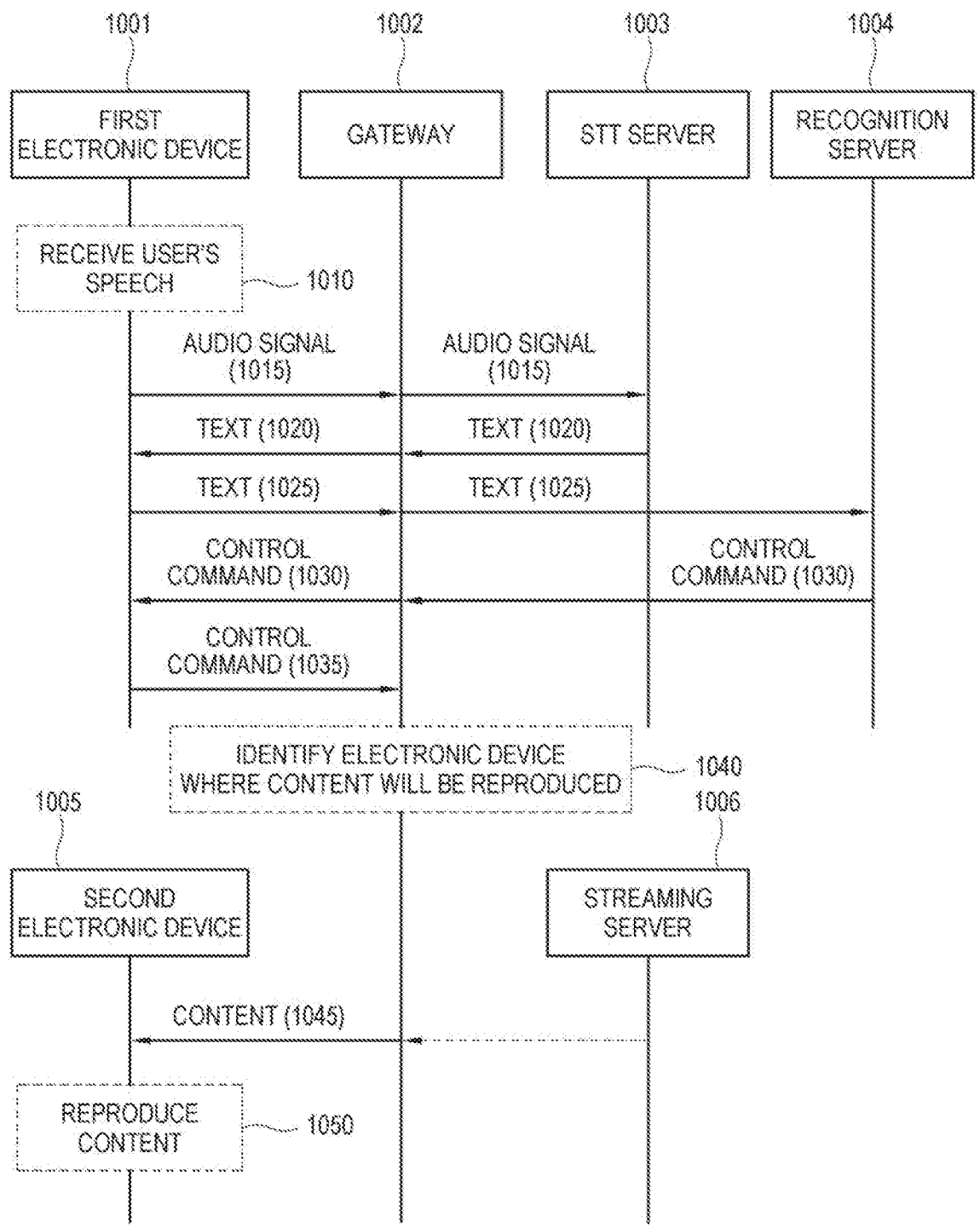
FIG. 10 illustrates an example of a signal transceiving process by which content is transmitted to an electronic device in response to a user's speech in a network system according to an embodiment of the disclosure.

FIG. 10 illustrates an example of a signal transceiving process by which content is transmitted to an electronic device in response to a user's speech in a network system according to an embodiment of the disclosure.

As shown in FIG. 10, a first electronic device 1001, a gateway 1002, a speech-to-text (STT) server 1003, a recognition server 1004, a second electronic device 1005, and a streaming server 1006 are provided. These elements can communicate with one another through the gateway 1002. In this embodiment, the first electronic device 1001 and the second electronic device 1002 are separately provided. Alternatively, the first electronic device and the second electronic device may be provided as one element.

The first electronic device 1001 is provided to receive a user's speech. The first electronic device 1001 includes a microphone in itself, and receives a user's speech through the microphone. Alternatively, a remote controller for the first electronic device 1001 may include a microphone. In this case, the remote controller converts a user's speech received through the microphone into an audio signal, and transmits the audio signal to the first electronic device 1001.

When the first electronic device 1001 is designed to perform a general voice recognition function, the first electronic device 1001 converts an audio signal corresponding to a user's speech into a text in itself, and draws a control command from the converted text. However, when the first electronic device 1001 does not support the voice recognition function in itself, the first electronic device 1001 may transmit the audio signal to a separate apparatus for implementing the voice recognition function and receive a recognition result. As an example of such a separate apparatus, there are the STT server 1003 having an STT function for converting an audio signal into a text, the recognition server 1004 for analyzing the text and drawing a control command corresponding to the text, etc. The STT server 1003 and the recognition server 1004 are merely named based on corresponding functions. In other words, the STT server 1003 and the recognition server 1004 may be separate servers like those in this embodiment, but may be a single integrated server.

Below, it will be described that a user makes a speech for designating an electronic device, by which content will be reproduced, in response to an event for reproducing the content.

The first electronic device 1001 transmits an audio signal to the STT server 1003 through the gateway 1002 in order to acquire a text corresponding to the audio signal based on the speech of the user (1015).

The STT server 1003 converts the audio signal from the first electronic device 1001 into the text, and transmits the converted text to the first electronic device 1001 through the gateway 1002 (1020).

The first electronic device 1001 transmits the text to the recognition server 1004 through the gateway 1002 in order to obtain a control command corresponding to the text received from the STT server 1003 (1025).

The recognition server 1004 draws the control command by analyzing the text from the first electronic device 1001, and transmits the drawn control command to the first electronic device 1001 through the gateway 1002 (1030).

The first electronic device 1001 transmits the control command received from the recognition server 1004 to the gateway 1002 so that the gateway 1002 can carry out the control command (1035). The control command involves an instruction for designating an electronic device that will produce the content.

The gateway 1002 may identify an electronic device designated by the control command from the first electronic device 1001, and may for example identify that the content is transmitted to the second electronic device 1005 (1040).

Accordingly, the gateway 1002 transmits the content received from the streaming server 1006 to the second electronic device 1005 (1045).

The second electronic device 1005 reproduces the streaming content through the gateway 1002 (1050).

Thus, the gateway 1002 may select the electronic device suitable for reproducing the content, in response to a user's speech.

In this embodiment, the electronic device is selected based on not the reference information of the foregoing embodiment but a user's speech. However, the reference information and a user's speech may be selectively used. For example, the gateway basically uses the reference information to identify the electronic device suitable for reproducing the content, and uses a user's speech instead of the reference information to select an electronic device when the electronic device is designated by the user's speech in response to the event for reproducing the content.

The first electronic device 1001 may be actualized by a remote controller with a microphone or a mobile device such as a mobile phone. The first electronic device 1001 may have an application installed to execute the foregoing process including the operation related to voice recognition and the operation of identifying the electronic device. The application may be installed or not installed when a product is launched. In the latter case, the first electronic device 1001 may access a server that provides the application, and download the application from the server, thereby installing the application.

Meanwhile, in the foregoing embodiments, the gateway selects the electronic device based on the reference information where the multimedia content is previously designated corresponding to the plurality of electronic devices. Besides such a method where the gateway selects the electronic device based on the reference information, there may be many methods. In this regard, an embodiment will be described below.

Figure 11:
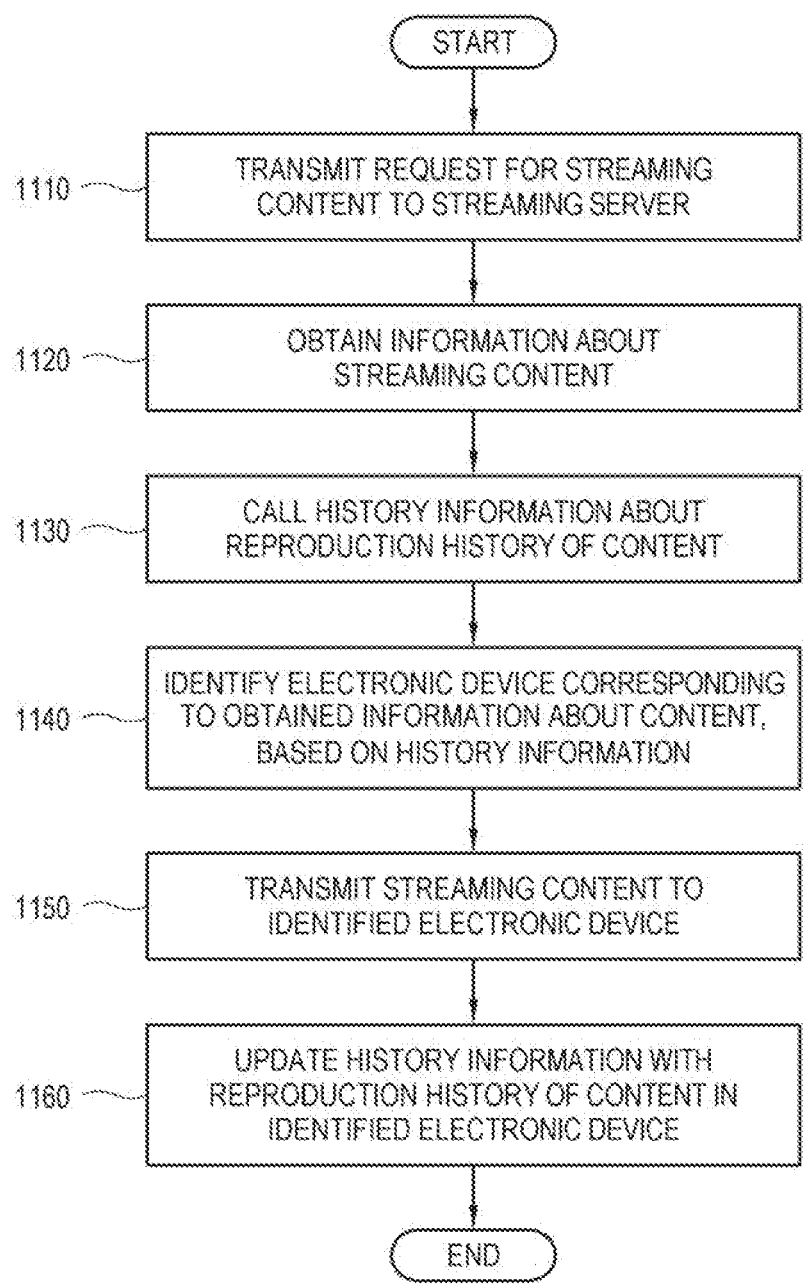
FIG. 11 is a flowchart showing a process where a gateway according to an embodiment of the disclosure selects an electronic device based on a use history.

FIG. 11 is a flowchart showing a process where a gateway according to an embodiment of the disclosure selects an electronic device based on a use history.

As shown in FIG. 11, the following operations are performed by the processor of the gateway.

At operation 1110, the gateway transmits a request for content streaming to the streaming server when receiving the request.

At operation 1120, the gateway obtains information about content when the content is received from the streaming server. For example, the gateway extracts metadata of the content from the received content, and obtains information about the attributes of the content recorded in the extracted metadata.

At operation 1130, the gateway calls history information about a reproduction history corresponding to content of the electronic devices inside the system. The history information may include a reproduction history according to the attributes of the content reproduced by each electronic device during a predetermined period of time, or the number of unit times in which the content is reproduced or streamed in each electronic device according to the attributes of the content. Besides, the history information may be actualized in various ways. In brief, the history information is provided to identify an electronic device by which content of a specific attribute is the most reproduced at a current point in time. The history information may be stored in the gateway, or may be stored in a predetermined electronic device within the system. In the latter case, the gateway obtains the history information from the corresponding electronic device as necessary.

At operation 1140, the gateway identifies the electronic device corresponding to the obtained information about the content, based on the called history information. In other words, the gateway identifies the electronic device corresponding to the obtained attribute of the content in the called history information. For example, the gateway identifies the electronic device, by which the content of the obtained attribute is the most reproduced, based on the history information.

At operation 1150, the gateway transmits the streaming content to the identified electronic device. Thus, the gateway makes the content streamed from the streaming server be reproduced in the identified electronic device.

At operation 1160, the gateway updates the previously stored history information with the history of the content reproduced by the identified electronic device. In other words, the gateway updates the history information with the history of reproducing the content in the corresponding electronic device during the current streaming process, so that the updated history information can be used during the streaming process in the future.

An actual example is as follows. The gateway is informed that a genre of content is sports, based on the metadata of the content streamed from the server. The gateway identifies an electronic device, which has a history of reproducing content of the sport genre, from the called history information. When it is informed based on the history information that the first TV and the second TV are the electronic devices by which content of the sport genre is reproduced, the first TV has reproduced the content five times, and the second TV has reproduced the content seven times, the gateway identifies that the second TV is the electronic device having a history of the most reproducing the content of the sport genre, based on the history information.

The gateway transmits the content to the identified second TV so that the second TV can reproduce the corresponding content. Then, the gateway updates the history information by modifying the number of reproducing times the second TV has into eight times in the history information.

Meanwhile, in the foregoing embodiment, the gateway or the analysis server identifies an attribute of content, and selects an electronic device by which the content will be reproduced based on the reference information. However, the process may be performed by a predetermined electronic device capable of communicating with the gateway inside the system. Below, such an embodiment will be described.

FIG. 12 illustrates an example of a signal transceiving process by which an electronic device in a network system according to an embodiment of the disclosure selects a predetermined electronic device for reproducing content streaming from a server.

As shown in FIG. 12, a first electronic device 1201, a second electronic device 1202, a gateway 1203, and a streaming server 1204 are provided. These elements can communicate with one another through the gateway 1203. In this embodiment, the first electronic device 1201 and the second electronic device 1202 are separately provided. Alternatively, the first electronic device and the second electronic device may be provided as one element.

The first electronic device 1201 has an application for carrying out the process according to an embodiment of the disclosure. The application may be installed in an operating system of the first electronic device 1201 or may be integrated into the operating system when a product is launched. Further, the application may be stored in a separate server without being installed in the first electronic device 1201 when the product is launched, and downloaded from the server and installed in the first electronic device in response to a user's selection in the future.

When an event for reproducing content occurs (1210), the streaming server 1204 streams content to the gateway 1203 (1220).

The gateway 1203 transmits metadata extracted from the content received from the streaming server 1204 to the first electronic device 1201 (1230). In this case, the gateway 1203 may extract the metadata from the content, and transmit only the extracted metadata to the first electronic device 1201. Alternatively, the gateway 1203 may transmit the content to the first electronic device 1201 without extracting the metadata from the content, and thus the first electronic device 1201 may extract the metadata from the content.

The first electronic device 1201 identifies the attribute of the content from the received metadata (1240).

The first electronic device 1201 obtains the reference information, and identifies the electronic device corresponding to the identified attribute from the reference information (1250). For example, the first electronic device 1201 may identify the second electronic device 1202 corresponding to the identified attribute, by searching the reference information.

The first electronic device 1201 transmits a result of identifying the second electronic device 1202 to the gateway 1203 (1260). Therefore, the gateway 1203 is informed that the content from the streaming server 1204 has to be transmitted to the second electronic device 1202.

The gateway 1203 transmits the content from the streaming server 1204 to the second electronic device 1202 in accordance with identification results from the first electronic device 1201 (1270).

The second electronic device 1202 reproduces content received through the gateway 1203 (1280).

Like this, the electronic device 1202 corresponding to the content is identified by not the gateway 1203 but the electronic device 1201.

The operations of the electronic apparatus described in the foregoing embodiments may be performed by artificial intelligence provided in the corresponding electronic apparatus. The artificial intelligence may be applied to various general systems by utilizing a machine learning algorithm. An artificial intelligence system refers to a computer system with intelligence of a human or being second to a human. In such a system, a machine, an apparatus or a system autonomously performs leaning and determining and is improved in accuracy of recognition and determination based on accumulated experiences. The artificial intelligence is based on elementary technology by utilizing machine learning (deep-running) technology and algorithms based on an algorithm of autonomously classifying and learning features of input data, and copying perception, determination and the like functions of a human brain.

The elementary technology may for example include at least one of language comprehension technology for recognizing a language and a text of a human, visual understanding technology for recognizing a thing like a human sense of vision, inference and prediction technology for determining information and logically making inference and prediction, knowledge representation technology for processing experience information of a human into knowledge data, and motion control technology for controlling a vehicle's automatic driving or a robot's motion.

Here, linguistic comprehension refers to technology of recognizing, applying and processing a human's language or text, and includes natural language processing, machine translation, conversation system, question and answer, voice recognition and synthesis, etc.

Inference and prediction refer to technology of determining information and logically making prediction, and includes knowledge- and probability-based inference, optimized prediction, preference-based plan, recommendation, etc.

Knowledge representation refers to technology of automating a human's experience information into knowledge data, and includes knowledge building such as data creation and classification, knowledge management such as data utilization, etc.

The methods according to the foregoing embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a voltage or nonvolatile storage such as a read only memory (ROM) or the like, regardless of whether it is deletable or rewritable, for example, a RAM, a memory chip, a device or integrated circuit (IC) or the like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the embodiments. The program command recorded in this storage medium may be specially designed and configured according to the embodiments, or may be publicly known and available to those skilled in the art of computer software.

Although a few embodiments have been shown and described, it will be appreciated by those skilled in the art that changes may be made in these embodiments without departing from the principles and spirit of the invention, the scope of which is defined in the appended claims and their equivalents.

What is claimed is:

1. An electronic apparatus, comprising:
    a communicator configured to communicate with a plurality of electronic devices; and
    a processor configured to:
        obtain information indicating a first attribute of multimedia content, among a plurality of attributes, in response to an event occurring in relation to the multimedia content,
        based on reference information referring to the plurality of attributes designated in correspondence with the plurality of electronic devices, respectively, identify a first electronic device, matched in correspondence with the first attribute of the multimedia content indicated by the obtained information, among the plurality of electronic devices, and
        control the communicator to transmit the multimedia content to the first electronic device,
    wherein the processor is further configured to:
        based on a plurality of first electronic devices corresponding to the first attribute being designated in the reference information, identify a second electronic device corresponding to a second attribute of multimedia content designated in the reference information among the plurality of first electronic devices, wherein the first attribute includes a media type of the multimedia content and the second attribute includes a genre of the multimedia content,
    wherein the processor identifies the first electronic device based on the reference information of a currently identified user among a plurality of pieces of the reference information respectively provided with regard to a plurality of users,
    wherein the processor identifies the first electronic device based on reference information of another user when the first electronic device is unselectable based on the reference information of the currently identified user.

2. The electronic apparatus according to claim 1, wherein the processor identifies the first electronic device by searching the reference information and as a result of the searching, the first electronic device is matched in correspondence with the first attribute of the multimedia content in relation to which the event has occurred.

3. The electronic apparatus according to claim 2, wherein the processor stores the reference information which is input through a user interface (UI) to designate the first electronic device corresponding to the first attribute of the multimedia content, and calls the reference information when the event occurs.

4. The electronic apparatus according to claim 3, wherein the UI further displays a sub menu including:
    items to select one electronic device among the plurality of electronic devices with regard to a designated attribute of the multimedia content, and
    an item unselectable by a user, the item corresponding to a respective one electronic device among the plurality of electronic devices using which the multimedia content is unreproducible.

5. The electronic apparatus according to claim 4, wherein the item unselectable by the user on the sub menu is determined based on device information of the respective electronic device among plurality of device information provided from the plurality of electronic devices, respectively.

6. The electronic apparatus according to claim 2, wherein the first attribute of the multimedia content includes a genre of the multimedia content or a media type of the multimedia content.

7. The electronic apparatus according to claim 2, wherein the processor identifies the first attribute of the multimedia content from metadata of the multimedia content.

8. The electronic apparatus according to claim 1, wherein the processor receives the multimedia content from another apparatus through the communicator or obtains the multimedia content which is stored in a storage.

9. A method of controlling an electronic apparatus, the method comprising:
    obtaining information indicating a first attribute of multimedia content, among a plurality of attributes, in response to an event occurring in relation the multimedia content;
    based on reference information referring to the plurality of attributes designated in correspondence with the plurality of electronic devices, respectively, identify a first electronic device, matched in correspondence with the first attribute of the multimedia content indicated by the obtained information, among the plurality of electronic devices; and
    controlling the multimedia content to be transmitted to the first electronic device,
    wherein, based on a plurality of first electronic devices corresponding to the first attribute being designated in the reference information, a second electronic device corresponding to a second attribute of multimedia content designated in the reference information among the plurality of first electronic devices is identified,
    wherein the first attribute includes a media type of the multimedia content and the second attribute includes a genre of the multimedia content,
    the method further comprising:
        identifying the first electronic device based on the reference information of a currently identified user among a plurality of pieces of the reference information respectively provided with regard to a plurality of users, selecting the first electronic device based on reference information of another user when the first electronic device is unselectable based on the reference information of the currently identified user.

10. The method according to claim 9, wherein the first electronic device is identified by searching the reference information and as a result of the searching, the at least electronic device is matched in correspondence with the first attribute of the multimedia content in relation to which the event has occurred.

11. The method according to claim 10, further comprising:
storing the reference information which is input through a user interface (UI) to designate the first electronic device corresponding to the first attribute of the multimedia content, and calling the reference information when the event occurs.

12. The method according to claim 11, wherein the UI further displays a sub menu including:
items to select one electronic device among the plurality of electronic devices with regard to a designated attribute of the multimedia content, and
an item unselectable by a user, the item corresponding to a respective one electronic device among the plurality of electronic devices using which the multimedia content is unreproducible.

13. The method according to claim 12, wherein the item unselectable by the user on the sub menu is determined based on device information of the respective electronic device among plurality of device information provided from the plurality of electronic devices, respectively.

14. The method according to claim 10, wherein the first attribute of the multimedia content includes a genre of the multimedia content or a media type of the multimedia content.

15. The method according to claim 10, further comprising:
identifying the first attribute of the multimedia content from metadata of the multimedia content.

16. The method according to claim 9, further comprising:
receiving the multimedia content from another apparatus through the communicator or obtaining the multimedia content which is stored in a storage.

* * * * *